United States Patent [19]

Fujimaru et al.

[11] 4,367,094

[45] Jan. 4, 1983

[54] SLUMP REDUCTION-PREVENTING AGENT AND METHOD FOR IMPROVING APPLICABILITY OF MORTAR CONCRETE

[75] Inventors: Yukio Fujimaru, Iwakuni; Toshihiro Sugiwaki, Yamaguchi; Keiji Ueoka, Ohtake; Shigenobu Fujioka, Iwakuni, all of Japan

[73] Assignee: Sanyo-Kokusaku Pulp Co., Ltd., Tokyo, Japan

[21] Appl. No.: 198,949

[22] PCT Filed: Sep. 12, 1979

[86] PCT No.: PCT/JP79/00243

§ 371 Date: Jun. 16, 1980

§ 102(e) Date: Jun. 16, 1980

[87] PCT Pub. No.: WO80/00835

PCT Pub. Date: May 1, 1980

[51] Int. Cl.³ .................................................. C04B 7/35
[52] U.S. Cl. .................................... 106/90; 106/314
[58] Field of Search ................ 106/90; 260/124 R

[56] References Cited

U.S. PATENT DOCUMENTS 3,375,873  4/1968  Mitchell ............................. 106/90
3,476,740 11/1969  Markham et al. .................. 106/90
3,578,651  5/1971  Ludwig .............................. 260/124
3,841,887 10/1974  Falkehag et al. ................. 260/124
4,047,567  9/1977  Childs et al. ...................... 106/90
4,065,318 12/1977  Detroit et al. ..................... 106/90
4,181,652  1/1980  Detroit ........................... 260/124 R
4,219,471  8/1980  Detroit .............................. 106/90

OTHER PUBLICATIONS

Ramachandran, V. S., Zement-Kalk-Gips, vol. 31, No. 4, Apr. 1978, pp. 206–210.

*Primary Examiner*—James Poer
*Attorney, Agent, or Firm*—Oblon, Fisher, Spivak, McClelland & Maier

[57] ABSTRACT

An agent for preventing deterioration in the slump properties of mortar concrete, containing as a main ingredient a lignin sulfonate having a carboxyl group content of at least 0.2 mols and a sulfon group content of at least 0.1 mols per phenyl propane unit. Disclosed is also a method for improving the workability of mortar concrete, comprising adding said agent to the mortar concrete in an amount of 0.05 to 0.5% in relation to cement and at any suitable point of time before or after mixing.

2 Claims, No Drawings

SLUMP REDUCTION-PREVENTING AGENT AND METHOD FOR IMPROVING APPLICABILITY OF MORTAR CONCRETE

FIELD OF THE INVENTION

The present invention is concerned with the use of a lignin sulfonate product obtained by special treatment of lignin and containing more than 0.2 mols of carboxyl groups and more than 0.1 mols of sulfon groups per phenyl propane unit as an agent for preventing deterioration in the slump properties of mortar concrete and the method for using the same.

BACKGROUND OF THE INVENTION

Mortar concrete is subjected to a hydration reaction upon addition of water thereto and its consistency drops with the lapse of time. Such a lowering of consistency gives rise to some trouble in placing or compacting of concrete, although the degree of such a lowering may be depending upon the kinds of cements, aggregates or admixtures, the mixing conditions and the post-treatment conditions.

Recently wide acceptance of air-entraining agents or cement dispersants plays an important role in improvements in the various physical properties of mortar cement. However, such air-entraining agents and/or cement dispersants have little or no affect on the prevention of a lowering of consistency with the lapse of time and rather have a tendency to promote it.

Among the cement dispersants a so-called high-powered dispersant which excels especially in the dispersing effect and may be used in considerable amounts with causing any adverse influence such as delays in setting or excess entrainment of air is being widely used for the production of mortar concrete demanded to be of high strength, inter alia, secondary products at a factory. It is noted, however, that the addition of such a high-powered dispersant, for instance a high condensation product of naphthalene sulfonate and formaldehyde, a co-condensation product of naphthalene sulfonate and lignin sulfonate formaldehyde or sulfonate product of a melamine formaldehyde condensation product to mortar concrete results in a marked lowering of consistency with the lapse of time as compared with that having no admixture.

This lowering of consistency with the lapse of time presents many problems including:
1. Limited period of time during which the ready-mixed mortar concrete can be transported;
2. Variations in the quality of the placed ready-mixed mortar concrete which are caused by changes in consistency due to changes in the preservation time at a placing region;
3. Limitations placed on the transportation distance of concrete by pumping and clogging or jamming of piping; and
4. Unsatisfactory compacting caused in case of using centrifugal molding.

In order to solve these problems such various methods as mentioned below have heretofore been proposed or actually carried out; however, no satisfactory results are still obtained.

Among these methods, there is a method for obtaining a somewhat large increase in consistency at the time of mixing by increasing the amount of water added per unit, thereby compensating for a lowering of consistency during the preservation of concrete. In this method, however, the water to cement ratio increases with decreases in strength and durability. In addition, there is a fear that segregation or clogging of a pump may be caused. Since the centrifugal molding permits an given amount of water to be squeezed out the concrete, the addition of an increased amount of water seemingly gives rise to no difficulties, but a considerably degree of segregation possibly takes place, thus leading to losses of strength.

In order to avoid this defect, an additional step of increasing the weight of cement per unit in proportion to increases in the quantity of water per unit may be provided; although this step is useful for the prevention of a lowering of strength, however, it results in not only an economical disadvantage but also a great degree of shrinkage and hence cracking of the cured mortar cement.

In a word, the aforesaid method for adjusting the consistency of the concrete upon mixing to above a given value by increasing the amount of water per unit offers no satisfactory solution for reducing an essential lowering of consistency with the lapse of time.

On the other hand, another conventional method which is old but frequently used in recent years is a so-called "delayed addition process for cement dispersants". More specifically, this process involves the addition of a cement dispersant, which must substantially be added at the starting point of mixing, after several tens seconds to a few minutes of the addition of water to increase the consistency of the resultant concrete, and hence brings about improvements in delaying the rate of setting and prevents a lowering of the consistency with the subsequent lapse of time. Compared with the method merely permitting the quantity of water to be increased, this process is said to be an efficient way; however, no satisfactory results are still obtained for the effect of reducing a lowering of consistency.

Furthermore, this process has such disadvantage that mixing is difficult till the addition of dispersants due to the absence of any dispersant at the time of initial mixing. In particular, its practical use is impossible when use is made of a concrete mixture which has a small water to cement ratio and must therefore contain the high-powered cement dispersant. In order to overcome this disadvantage, a so-called "division addition method" is proposed, which comprises introducing a part of the dispersant at the starting point of mixing and the remainder in the course of mixing. In any event, this process is no more than a variation of the delayed addition process and is considered to have a more unfavorable effect on the prevention of a lowering of consistency with the lapse of time than do the delayed addition process.

Recently, the spotlight of attention is focused upon a so-called "in-situ addition process" which is designed to add in-situ the high-powered dispersant to mortar concrete having a reduced consistency to thereby restore the consistency to the original value. Upon restoration, however, the life time of the concrete is at most 25 to 30 minutes as the consistency of the concrete incorporated with the high-powered dispersant drops sharply. In order to extend the life time, it may be possible to add the high-powered dispersant in several portions. However, this method is troblesome to operate and difficult to control so that material segregation may occur depending upon the mixing conditions. This results in the set mortar concrete of inferior quality being produced.

As will be evident from the foregoing, while the cement dispersants have heretofore played a significant role in improvements in the various properties of the mortar concrete, they have a tendency toward promoting a lowering of consistency with the lapse of time. In order to cope with this problem, various attempts have been proposed or reduced to practical use. Nonetheless, it is found that they offer neither essential solution nor satisfactory result.

Under the situation being like this, there is a strong demand for the development of more efficient admixtures and methods for permitting prevention of a lowering the consistency of mortar concrete.

DISCLOSURE OF THE INVENTION

Concerned with this problem, the present inventiors

Eight (8) lignin-based substances refined by ultrafiltration (fraction molecular weight: 1000) and used as samples are as follows;

No. 1 ... Sulfite pulp waste
No. 2 ... Lignin sulfonate-based cement dispersant which is commercially available
No. 3 ... Sulfite pulp waste oxidized by hydrogen peroxide in an alkaline atmosphere
No. 4 ... Sulfite pulp waste oxidized by air in an alkaline atmosphere
No. 5 ... The same as No. 4 provided that the degree of oxidation is high
No. 6 ... Sulfo-methyl derivative of No. 5
No. 7 ... Reaction product between kraft pulp waste and monochloroacetic acid, which is sulfomethylated to a less degree
No. 8 ... No. 7 reaction product sulfo-methylated to a substantial degree

TABLE 1

| Kinds of refined lignin sulfonates | Carboxyl group content (in mols per $C_6$-$C_3$ unit) | Sulfon group content (in mols per $C_6$-$C_3$ unit) | Amounts of Al complex precipitated (g/g) | Concrete Test Results | | | | | |
|---|---|---|---|---|---|---|---|---|---|
| | | | | Amounts (in % in relation to C) | Slumps (cm) | | | Amount of air | | |
| | | | | | Upon mixing | After 60 min. | After 120 min. | Upon mixing | After 60 min. | After 120 min. |
| NO. 1 | 0.08 | 0.54 | 0.17 | 0.20 | 18.4 | 12.0 | 9.4 | 4.8 | 3.4 | 3.1 |
| NO. 2 | 0.12 | 0.43 | 0.24 | " | 19.0 | 12.6 | 10.5 | 4.1 | 3.5 | 3.3 |
| NO. 3 | 0.22 | 0.33 | 0.71 | " | 18.8 | 16.3 | 15.5 | 4.0 | 3.3 | 3.3 |
| NO. 4 | 0.30 | 0.26 | 0.93 | " | 19.4 | 19.0 | 17.6 | 4.3 | 3.1 | 3.2 |
| NO. 5 | 0.40 | 0.18 | 1.32 | " | 19.0 | 18.6 | 18.0 | 3.8 | 3.0 | 2.9 |
| NO. 6 | 0.38 | 0.40 | 1.06 | " | 18.6 | 17.8 | 17.1 | 4.0 | 3.3 | 3.1 |
| NO. 7 | 0.30 | 0.08 | 0.99 | " | 18.8 | 11.4 | 6.3 | 4.9 | 3.4 | 3.5 |
| NO. 8 | 0.30 | 0.31 | 0.78 | " | 19.3 | 16.8 | 16.2 | 4.5 | 3.2 | 3.0 | made basic and extensive investigations or studies and, in view of the fact that one factor responsible for a lowering of consistency is correlated to the behavior of the $C_3A$ hydration, investigated a chelating reaction between a variety of substances and aluminium. As a consequence, the present inventors found that a lignin sulfonate containing a larger amount of carboxyl groups which form an insoluble complex with aluminium has a striking effect on the prevention of a lowering of consistency with the lapse of time, and have accomplished the instant invention.

The present invention relates to the agents useful for preventing deterioration in the slump properties of mortar concrete and the methods for improving the workability thereof with the use of such agents.

More particularly, the present invention pertains to the agents for preventing deterioration in the slump properties of mortar concrete which agents are obtained by special treatment of lignin and contain more than 0.2 mols of carboxyl groups and more than 0.1 mols of sulfonic groups per unit of phenylpropane providing its skeleton, and is also concerned with the methods for improving the workability of mortar concrete characterized in that said agents are added in the amounts of 0.05 to 0.5% in relation to cement at the starting point of mixing, in the course of mixing or at any point of time between mixing and placing.

With a variety of refined lignin-based substances having different carboxyl group contents, the effects that they have on the prevention of deterioration in the slump properties of concrete and on the formation of an insoluble complex with aluminium were investigated, one example of the obtained results being summarized in Table 1.

MEASUREMENT OF THE AMOUNTS OF CARBOXYL AND SULFON GROUPS

The samples under test were passed through a cation exchange resin to remove bases therefrom. Thereupon, the respective samples were subjected to conductometric tiltration with the aid of 0.5 N—$NH_4OH$. Measurements were separately made on the entire amounts of C, $OCH_3$ and C=) in a basefree state, thereby determining the amounts of carboxyl and sulfon groups per phenyl propane ($C_6$-$C_3$) unit.

MEASUREMENT OF THE AMOUNT OF THE AL COMPLEX PRECIPITATED

A liquid solution having a lignin concentration of 1.0% and an $AlCl_3$ concentration of 0.1 mols per liter was prepared and regulated to pH 3.0. Upon aging at 20° C. for 15 minutes, the amount preciptated was determined to express it by an absolute dry weight per gram of lignin.

CONCRETE TEST

An ordinary portland/gravel/crushed rock system was mixed in a tiltable mixer for three minutes under the conditions: the maximum size of coarse aggregate: 25 mm; the unit weight of cement: 300 kg/cm³; the ratio of fine to coarse aggregates: 47%; the slump: 19±1 cm; and the amount of air: 4±1%. Thereupon, the slump and the amount of air were determined. The lignin sulfonate was dissolved in a mixing liquid for use, and the temperature at which mixing was finished was 20°±1° C.

As will be evident from Table 1, the influences that the lignin-based substances have on the formation of an insoluble complex with aluminium and the degree of a lowering of the consistency of concrete vary markedly depending upon the carboxyl group content per phenyl propane unit.

The lignin sulfonates are well-known cement dispersants but, as will be understood from Table 1, the substances of generally referred to as the lignin sulfonates have a variety of properties. The lignin sulfonates heretofore used as cement dispersants have a carboxyl group content of at most about 0.12 mols per phenyl propane unit and have little or no effect on the prevention of a lowering of consistency with the lapse of time or, in some cases, even have a tendency to promote it.

Over the conventional lignin sulfonate-based cement dispersants, the present invention has an quite unexpectedly effect.

In what follows, the present invention will be explained in more details. In the present invention, it is most preferred that the agents for preventing deterioration in the slump properties contain at least 0.2 mols, particularly more than 0.3 mols of carboxyl groups per phenyl propane unit, as will be seen from Table 1. All the amounts of the carboxyl and sulfon groups referred to herein are determined on the refined lignin sulfonates by ultrafiltration (fraction molecular weight: 1000) in accordance with the aforesaid conductometric titration.

Usually, the lignin sulfonates and thiolignin prepared through refinement of sulfite pulp wastes and kraft pulp wastes obtained as by-products at a pulp plant have a carboxyl group content of about 0.10 and 0.15 mols, respectively, and are not applicable in themselves to the present invention. The lignin sulfonates which may used in the present invention should have an increased carboxyl group content; this may be achieved by allowing them to be oxidized or to react with carboxyl group-containing compounds. Typical examples include those obtained by air-oxidation in an alkaline atmosphere or oxidation using hydrogen peroxide, or reaction with monochloroacetic acid.

Another requirement for the present agents is that they contain at least 0.10 mols of sulfon groups per phenyl propane unit. At a lower sulfon group content, the lignin sulfonates have no appreciable effect as will be understood from Table 1. In case of thiolignin, therefore, the introduction of sulfon groups is of importance.

In use, the present agents may contain other components which are originally included in pulp wastes, such as oxycarboxylates, resinates and the like substances, but are preferably provided by lignin sulfonates refined by suitable means such as ultrafiltration or fractional precipitation.

The agents according to the present invention are preferably added to, for instance, ready-mixed mortar concrete after several tens seconds to a few minutes of mixing rather than at the starting point of mixing, and are most preferably added simultaneously in view of workability when the high-powered dispersant is used with the factory-made products and slump-restoration method. As no limitation is placed in this respect, however, the agents may be added at the starting point of mixing, in the course of mixing or at any point of time between mixing and placing.

The mortar concrete to which the present invention is applied may or may not contain air-entraining agents and cement dispersants. When the air-entraining agents and/or cement dispersants are introduced simultaneously with the addition of the agents according to the present invention, they may be introduced independently or in liquid or powdery admixtures thereof.

By preference, the amount of the present agent to be added ranges from 0.05 to 0.5% (calculated as solid) in relation to cement. In an amount of less that 0.05%, it has little or no effect, whereas in an amount exceeding 0.5% it causes setting of the mortar concrete to proceed at a too slow rate, thus giving rise to poor strength. In the latter case, there is sometimes a fear that no setting takes place.

The present agent added in an amount of 0.05 to 0.5% gives rise to strength at the same stage as in the absence of such an agent or at a somewhat later stage. When it is desired to further promote setting, known setting or curing agents may be employed.

BEST MODE FOR CARRYING OUT THE INVENTION

For a better understanding of the effect and action attained by the present invention, reference will now be made to the following examples wherein given are experimental runs according to the present invention and control runs.

Example 1

Concrete samples prepared using a tiltable mixer and under the conditions specified in Table 2 were let alone on a mixing plate and transferred in the mixer for each 30 minutes for re-mixing. After the lapse of given time, the slumps and the amount of air were determined with respect to the thus prepared samples. The concrete temperature was then 30° to 33° C. The cement used was an ordinary portland cement; the fine aggregate gravel; the coarse aggregate crushed rock (the maximum size: 25 mm); and the fine to coarse aggregate ratio 47%. Adjustment of the amount of air was done with the use of an alkyl allyl sulfonate-based air entraining agent.

TABLE 2

| | | Conditions | | | | |
| | | Amounts of admixtures added (in % in relation to C) | | Composition | | |
| | Introduction of materials and mixing conditions | At the time of addition of water | Post - addition | W/C (g) | C (kg/m³) | W (kg/m³) |
|---|---|---|---|---|---|---|
| Present run | C + S + G + W  1 min. mixing<br>Admixture A  2 min. mixing | — | 0.25 | 60.3 | 300 | 181 |
| Control run 1 | C + S + G + W  1 min. mixing<br>Admixture a  2 min. mixing | — | 0.25 | 59.7 | " | 179 |
| Control run 2 | C + S + G + W +  3 min. mixing<br>Admixture a | 0.25 | — | " | " | " |

TABLE 2-continued

| | | Conditions | | | | |
|---|---|---|---|---|---|---|
| | | | Amounts of admixtures added (in % in relation to C) | | Composition | |
| | Introduction of materials and mixing conditions | | At the time of addition of water | Post - addition | W/C (g) | C (kg/m³) | W (kg/m³) |
| Control run 3 | C + S + G + W + Admixture a | 3 min. mixing (increased amounts of C + W) | 0.25 | — | " | 329 | 196 |
| Control run 4 | C + S + G + W + ½a ½a added | 1 min. mixing 2 min. mixing | 0.125 | 0.125 | " | 300 | 179 |

In the above-mentioned Table, C stands for cement; S for fine aggregate; G for coarse aggregate; and W for water. Admixture or additive A is a sulfite pulp liquid waste oxidized by oxygen in an alkaline atmosphere (this waste contains 42% of lignin sulfonate in its solid matter which includes 0.4 mols of carboxyl groups and 0.31 mols of sulfon groups per phenyl propane unit and further contains oxycarboxylates, resin acids, inorganic salts etc.) and is one of the present agents. Admixture a is a typical example of commercially available lignin sulfonate-based cement dispersants (the standard setting type dispersant manufactured and sold by Sanyo Kokusaku Pulp K.K. under the trade name Sunflow S). In the following examples, the amounts of admixtures added are calculated as solid.

Control run 1 was carried out according to the known post-addition method for cement dispersants; control run 2 carried out according to the ordinary method using cement dispersants; control run 3 carried out according to the method using increased amounts of cement and water; and control run 4 carried out according to the division method for cement dispersants. Table 2 indicates that the present method is superior to the prior art methods.

Example 2

Example 1 relates to a series of experimental runs where no cement dispersant was used but, in this example, it will be made clear that the present method has a particularly marked effect when use is made of cement dispersants.

According to Example 1, a series of experimental runs were carried out on the concrete samples prepared under the conditions specified in Table 4.

TABLE 3

| | Results | | | | | | | |
|---|---|---|---|---|---|---|---|---|
| | Slumps (cm) | | | | Amount of air (%) | | | |
| | Just upon mixing | After 60 min. | After 90 min. | After 120 min. | Just upon mixing | After 60 min. | After 90 min. | After 120 min. |
| Present run | 19.6 | 17.1 | 12.4 | 10.1 | 3.6 | 3.5 | 3.4 | 3.4 |
| Control run 1 | 20.6 | 12.7 | 9.0 | 7.0 | 3.4 | 3.7 | 3.8 | 3.6 |
| Control run 2 | 19.8 | 11.9 | 7.7 | 6.4 | 3.5 | 3.4 | 3.5 | 3.3 |
| Control run 3 | 21.0 | 15.0 | 12.4 | 9.5 | 3.3 | 3.3 | 3.5 | 3.1 |
| Control run 4 | 20.6 | 13.0 | 10.8 | 8.9 | 3.5 | 3.9 | 3.7 | 3.7 |

TABLE 4

| | | Conditions | | | | |
|---|---|---|---|---|---|---|
| | | Amounts of admixtures added (in % in relation to C) | | Composition | | |
| | Introduction of materials and mixing conditions | At the time of addition of water | Post - addition | W/C (g) | C (kg/m³) | W (kg/m³) |
| Present run 1 | C + S + G + W + Admixture b 1 min. mixing Admixture B 2 min. mixing | b 0.25 | B 0.15 | 59.7 | 300 | 179 |
| Present run 2 | C + S + G + W + Admixture b 1 min. mixing Admixture B 2 min. mixing | b 0.25 | B 0.25 | " | " | " |
| Present run 3 | C + S + G + W + Admixture b 1 min. mixing Admixture B 2 min. mixing | b 0.25 | B 0.35 | " | " | " |
| Control run 1 | C + S + G + W + Admixture b 1 min. mixing Admixture B 2 min. mixing | b 0.25 | B 0.02 | " | " | " |

TABLE 4-continued

| | | Conditions | | Composition | | |
|---|---|---|---|---|---|---|
| | | Amounts of admixtures added (in % in relation to C) | | | | |
| | Introduction of materials and mixing conditions | At the time of addition of water | Post - addition | W/C (g) | C (kg/m³) | W (kg/m³) |
| Control run 2 | C + S + G + W + Admixture b 1 min. mixing Admixture b 2 min. mixing | b 0.25 | b 0.25 | " | " | " |
| Control run 3 | C + S + G + W + Admixture b 1 min. mixing Admixture c 2 min. mixing | b 0.25 | c 0.10 | " | " | " |

Admixture B, one of the present agents for preventing deterioration in the slump properties, is a lignin sulfonate obtained by extraction of n-butanol-soluble matters from a sulfite pulp liquid waste oxidized by oxygen in an alkaline atmosphere and acidifing the resultant waste by sulfur followed by fractional filtration (the carboxyl group and sulfon group contents per phenyl propane unit are 0.44 and 0.34 mols, respectively). Admixture b is a typical example of commercially availably liginin sulfonate-based cement dispersants (the delayed setting type dispersant manufactured and sold by Sanyo Kokusaku Pulp K.K. under the trade name Sunflow R). Admixture c is sodium zirconate which is commercially available. The experimental results are set forth in Table 5. It should be noted that the compression strength is expressed as a value for that of the concrete prepared by molding just after mixing and then standard aging.

a carboxyl group-containing compound such as sodium gluconate together with the lignin sufonate-based cement dispersant, such sufficient results as achieved by the present invention are not obtained.

Example 3

A series of experiments were done using a combination of admixtures B and b used in Example 2 but at varying points of time at which admixture B was added. For comparison, a control run is given in which the high-powered dispersant of sulfonate product of a melamine formaldehyde condensation product-admixture d was used in lieu of B.

Mixing was effected using a tiltable mixer under the conditions specified in Table 6. Upon initial mixing, the resultant product was let alone on a mixing plate for a given period of time followed by addition of the admixture. After 90 and 120 minutes of the addition of water,

TABLE 5

| | Results | | | | | | | | | | |
|---|---|---|---|---|---|---|---|---|---|---|---|
| | Slumps (cm) | | | | Amount of air (%) | | | | Compression strength | | |
| | Just upon mixing | After 60 min. | After 90 min. | After 120 min. | Just upon mixing | After 60 min. | After 90 min. | After 120 min. | 3 days cooling | 7 days cooling | 28 days cooling |
| Present run 1 | 20.4 | 15.3 | 14.0 | 12.8 | 4.0 | 4.0 | 4.1 | 4.1 | 117 | 177 | 253 |
| Present run 2 | 21.8 | 18.7 | 18.8 | 17.7 | 4.9 | 4.6 | 4.3 | 4.2 | 108 | 174 | 249 |
| Present run 3 | 20.7 | 20.1 | 19.9 | 19.5 | 4.7 | 4.3 | 4.3 | 4.5 | 106 | 171 | 251 |
| Control run 1 | 19.6 | 12.4 | 9.6 | 8.5 | 4.6 | 4.3 | 4.1 | 4.0 | 114 | 171 | 251 |
| Control run 2 | 21.7 | 17.6 | 12.5 | 9.6 | 5.0 | 5.2 | 5.0 | 5.5 | 102 | 165 | 236 |
| Control run 3 | 20.0 | 11.8 | 8.4 | 7.1 | 4.4 | 3.8 | 3.6 | 3.7 | 111 | 181 | 243 |

From a comparison between experimental run 2 according to the present invention and control run 2, it is found that the present method is by far superior to the conventional method in which the lignin sulfonate-based cement dispersant is doubled in quantity. From control run 3, it is also found that even if use is made of the products were transferred into the mixer for re-mixing of one minute. The slumps and the amount of air were measured. The concrete temperature was then between 30° C. and 33° C. The cement and aggregates as well as the fine to coarse aggregate ratio were quite identical with those used in Example 1.

TABLE 6

| | Conditions | | | |
|---|---|---|---|---|
| | | Composition | | |
| | Introduction of materials and mixing conditions | W/C (%) | C (Kg/m³) | W (Kg/m³) |
| Present run 1 | C + S + G + W + Admixture b + Admixture B 3 min. mixing | 59.7 | 300 | 179 |
| Present run 2 | C + S + G + W + Admixture b 3 min. mixing Admixture B added after 10 minutes of addition water 1 min. mixing | " | " | " |
| Present | C + S + G + W + Admixture b 3 min. mixing | " | " | " |

TABLE 6-continued

| | Conditions | Composition | | |
|---|---|---|---|---|
| | Introduction of materials and mixing conditions | W/C (%) | C (Kg/m³) | W (Kg/m³) |
| run 3 | Admixture B added After 60 minutes of addition of water 1 min. mixing | | | |
| Control run 1 | C + S + G + W + Admixture b 3 min. mixing Admixture d added after 60 minutes of addition of water 1 min. mixing | " | " | " |

TABLE 7

| | Results | | | | | | |
|---|---|---|---|---|---|---|---|
| | Slumps (cm) | | | | Amount of air (%) | | |
| | Just upon mixing | Just before or after post-addition | After 90 min. of addition of water | After 120 min. of addition of water | Just upon mixing | Just before or after post-addition | After 90 min. of addition of water | After 120 min. of addition of water |
| Present run 1 | 21.0 | —/— | 17.7 | 17.1 | 5.1 | —/— | 5.0 | 5.1 |
| Present run 2 | 18.7 | —/21.4 | 18.4 | 17.3 | 4.7 | —/4.4 | 4.5 | 4.4 |
| Present run 3 | 18.8 | 10.5/19.6 | 18.1 | 16.5 | 4.2 | 3.5/3.6 | 3.9 | 3.8 |
| Control run 1 | 18.4 | 9.5/20.3 | 14.7 | 10.8 | 4.5 | 4.0/2.5 | 2.5 | 2.3 |

A comparison of experimental run 3 according to the present invention with control run 1 clearly indicates that the present method also provides an excellent slump-restoration method.

Example 4

Concrete samples were prepared by forced mixing for 90 seconds, and their slumps were measured just upon mixing and after 15 and 30 minutes of mixing. On the other hand, a portion of the concrete samples obtained just upon mixing and after the lapse of 30 minutes was centrifugally molded and let alone for 4 hours. Thereafter, this sample was vaporaged under the conditions: the heating rate: 20° C./hr, the maximum temperature: 75° C., and the retaining period: two hours. Upon releasing, the sample was further aged in an autoclave (180° C., 10 kg/cm² and five hours). Upon cooled as it stood, the compression strength of sample was measured. The cement used was an ordinary portland cement; the fine aggregate gravel; and the coarase aggregate crushed rock with its maximum size being 20 mm.

TABLE 8

| | Conditions | | Composition | | |
|---|---|---|---|---|---|
| | Introduction of materials and mixing conditions | kinds and amounts of admixtures | W/C (%) | C (Kg/m³) | W (Kg/m³) |
| Present run 1 | C + S + G + W + Admixture e + Admixture C 90 min. mixing | e..0.6 C..0.15 | 33.8 | 450 | 152 |
| Control run 1 | C + S + G + W + Admixture e 90 min. mixing | e..0.6 | " | " | " |
| Present run 2 | C + S + G + W + Admixture f + Admixture D 90 min. mixing | f..0.6 D..0.15 | " | " | " |
| Control run 2 | C + S + G + W + Admixture f 90 min. mixing | f.0.6 | " | " | " |

Admixture e is a commercially available high-powered dispersant based on a high condensation product of naphthalene sulfonic acid and formaldehyde, and admixture f is a commercially available high-powered dispersant based on a co-condensation product of naphthalene sulfonate/lignin sulfonate/formaldehyde. Admixture c is lignin sulfonate (containing 0.34 mols of carboxyl groups and 0.21 mols of sulfon groups per phenyl propane unit) prepared by oxidizing sulfite pulp wastes by air in an alkaline atmosphere, obtaining its sulfo-propyl derivative with the use of propane sultone and refining the derivative by ultrafiltration, and admixture d is a thiolignin sulfonate (containing 0.25 mols of carboxyl groups and 0.42 mols of sulfon groups per phenyl propane unit) prepared by oxidizing sulfite pulp wastes by air in an alkaline atmosphere and sulfomethylating the resultant product followed by ultrafiltration refinement. The latter two substances are the present agents for preventing deterioration in the slump properties.

TABLE 9

| | Slumps (cm) | | | Results | | Inner surfaces of samples | |
|---|---|---|---|---|---|---|---|
| | | | | Compression strength (Kg/m$^3$) | | | |
| | Mixing time | After 15 min. | After 30 min. | Molding just upon mixing | Molding after 30 min. | Molding just upon mixing | Molding after 30 min. |
| Present run 1 | 16.0 | 15.2 | 14.6 | 843 | 838 | good | good |
| Control run 1 | 15.3 | 11.5 | 6.2 | 829 | 744 | less good | poor |
| Present run 2 | 15.8 | 15.5 | 14.8 | 820 | 825 | good | good |
| Control run 2 | 15.0 | 13.7 | 9.6 | 831 | 772 | good | less poor |

The concrete prepared according to the present invention undergoes neither appreciable deterioration in the slump properties upon mixing nor a lowering of the strength between mixing and placing.

In addition, the inner surfaces of the concrete according to the present invention and subjected to centrifugal molding were much more smooth as compared with the control runs.

POSSIBLE APPLICATIONS FROM THE INDUSTRIAL POINT OF VIEW

Thus, a lowering of the consistency of mortar concrete with the lapse of time can be prevented by adding thereto the present agent for preventing deterioration in the slump properties thereof at the time of mixing, thus rendering it feasible to extend the period of time required for placing operations.

The embodiments of the invention in which an exclusive property or privilege is claimed are defined as follows:

1. A method for improving the workability of mortar concrete, which comprises adding thereto an agent for preventing deterioration in the slump properties thereof which agent contains as a main ingredient a lignin sulfonate having a carboxyl group content of at least 0.2 mols and a sulfon group content of at least 0.1 mols per phenyl propane unit, in an amount of 0.05 to 0.5% in relation to cement and at the starting point of mixing, in the course of mixing or at any point of time between mixing and placing, followed by mixing or re-mixing.

2. A method for improving the workability of mortar concrete using a cement dispersant, which comprises adding thereto, apart from said dispersant, an agent for preventing deterioration in the slump properties thereof which agent contains as a main ingredient a lignin sulfonate having a carboxyl group content of at least 0.2 mols and a sulfon group content of at least 0.1 mols per phenyl propane unit, in an amount of 0.05 to 0.5% in relation to cement and at the starting point of mixing, in the course of mixing or at any point of time between mixing and placing, followed by mixing or re-mixing.

* * * * *

UNITED STATES PATENT AND TRADEMARK OFFICE
CERTIFICATE OF CORRECTION

PATENT NO. : 4,367,094

DATED : January 4, 1983

INVENTOR(S) : Yukio Fujimaru et al

It is certified that error appears in the above-identified patent and that said Letters Patent is hereby corrected as shown below:

Please insert the following Foreign Application Priority Data:

[30] -- Foreign Application Priority Data

October 16, 1978 [JP] Japan.....53/127181 --.

Signed and Sealed this

Third Day of July 1984

[SEAL]

Attest:

GERALD J. MOSSINGHOFF

Attesting Officer     Commissioner of Patents and Trademarks